United States Patent [19]
Kaneko et al.

[11] Patent Number: 5,337,093
[45] Date of Patent: Aug. 9, 1994

[54] PROJECTION TELEVISION SYSTEM INCLUDING A PLURALITY OF DISPLAY ELEMENTS WITH CORRESPONDING OPTICAL AXES INCIDENT TO A SCREEN AT DIFFERENT POINTS OFFSET FROM THE SCREEN CENTER

[75] Inventors: Toshihide Kaneko; Eiichi Toide, both of Nagaokakyo, Japan

[73] Assignee: Mitsubishi Denki Kabushiki Kaisha, Tokyo, Japan

[21] Appl. No.: 98,256

[22] Filed: Jul. 29, 1993

Related U.S. Application Data

[63] Continuation of Ser. No. 809,155, Dec. 18, 1991, abandoned.

[30] Foreign Application Priority Data

Dec. 19, 1990 [JP] Japan ........................... 2-403503
May 30, 1991 [JP] Japan ........................... 3-127218
Oct. 30, 1991 [JP] Japan ........................... 3-283418

[51] Int. Cl.$^5$ .................... H04N 9/31; H04N 5/74; H04N 9/78
[52] U.S. Cl. .................... 348/778; 348/779; 348/781; 348/656
[58] Field of Search ................ 358/29, 60, 56, 64, 358/231, 237, 253; 313/478, 461; 359/456, 652, 443; H04N 9/31, 5/74, 9/78

[56] References Cited

U.S. PATENT DOCUMENTS 4,642,695  2/1987  Iwasaki ........................ 358/237
4,730,211  3/1988  Hasegawa ...................... 358/60
4,914,510  4/1990  Brennesholtz et al. ........... 358/60
5,010,397  4/1991  Hasegawa ...................... 358/60

FOREIGN PATENT DOCUMENTS

2116285   4/1990  Japan ..................... H04N 9/31
02121488  5/1990  Japan ..................... H04N 9/31
2186382   7/1990  Japan ..................... H04N 9/31

Primary Examiner—James J. Groody
Assistant Examiner—Safet Metjahic

[57] ABSTRACT

In a projection television system having display elements displaying images of respective colors, a screen on which a color image is formed by magnifying and synthesizing the images of the respective colors, projection lenses for magnifying the images on the respective display elements and projecting them onto the screen thereby to form the color image, with the optical axis of the projection lens for a first color being disposed at a right angle to the screen and the optical axes of the projection lenses for second and third colors being disposed at an angle with respect to the optical axis of the projection lens for the first color, color imbalance is reduced. This is achieved by disposing the projection lenses for the second and third colors so that their optical axes are incident on a point different from the point at which the optical axis of the projection lens for the first color is incident. In an alternative arrangement, at least one of the display elements is provided with a filler having a transmittance varied from one position to another.

21 Claims, 11 Drawing Sheets

PROJECTION TELEVISION SYSTEM INCLUDING A PLURALITY OF DISPLAY ELEMENTS WITH CORRESPONDING OPTICAL AXES INCIDENT TO A SCREEN AT DIFFERENT POINTS OFFSET FROM THE SCREEN CENTER

This application is a continuation of application Ser. No. 07/809,155 filed on Dec. 18, 1991, which is now abandoned.

BACKGROUND OF THE INVENTION

1. Field of the Invention

The present invention relates to a color projection television system which forms an image on a screen by magnifying and synthesizing images of the component colors, such as three primary colors, displayed on respective unicolor display elements, such as cathode-ray tubes or liquid crystal display units.

2. Background of the Invention

Figure 1:
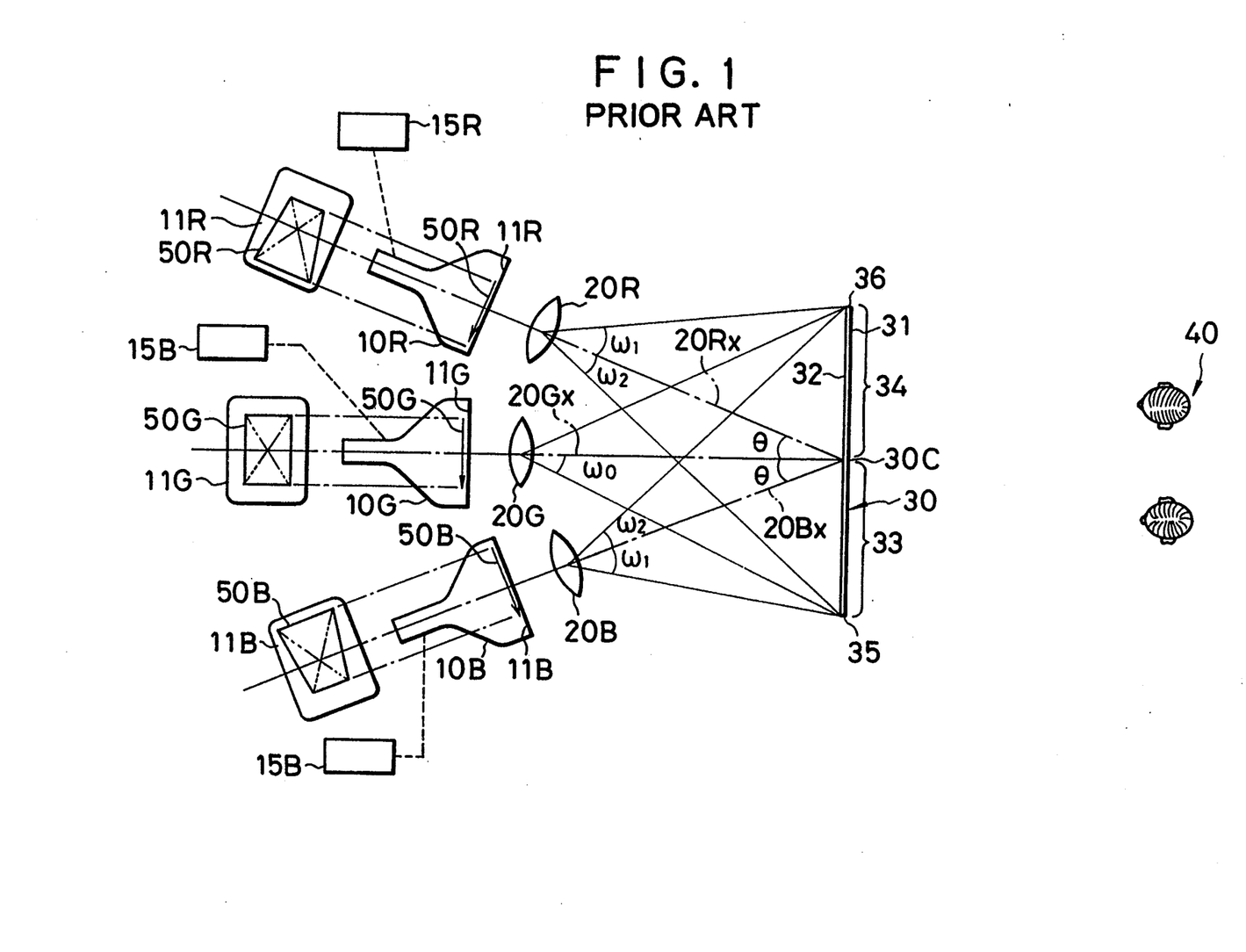
FIG. 1 is a schematic plan view showing an example of prior art projection television system.

Projection television systems are now finding more domestic and industrial applications. An example of prior art projection television system is shown in FIG. 1 which is a view as seen from above. As illustrated, it comprises a screen 30 having a front surface 31 and a rear surface 32, on which a color image is formed by magnifying and synthesizing unicolor images displayed on a green cathode-ray tube 10G, a red cathode-ray tube 10R, and a blue cathode-ray tube 10B. The screen 30 has a transmittance, and the image projected on the rear surface 32 is seen on the front surface 31. Viewers 40 sit facing the front surface 31 and see the image on the front surface 31. The cathode-ray tubes 10G, 10R and 10B are disposed side by side. The green cathode-ray tube 10G is at the center, and the red cathode-ray tube 10R and the blue cathode-ray tube 10B are on the respective sides (the right side (upper side as seen in the figure) and the left side (lower side as seen in the figure) as seen from the viewers 40) of the green cathode-ray tube 10G. The light rays forming the images from the three cathode-ray tubes 10G, 10R and 10B are converged by respective lenses 20G, 20R and 20B, and focused on the rear surface 32 of the screen 30, and a full-color image is formed on the rear surface 32 of the screen 30. The lens 20G is so disposed that its optical axis 20Gx is normal to the surface of the screen 30. The lenses 20R and 20B are so disposed that their optical axes 20Rx and 20Bx are at an angle (converging angle) $\theta$ with respect to a normal line on the surface of the screen 30. That is, the lens surfaces are at an angle $\theta$ with respect to the surface of the screen 30.

A problem associated with the prior art projection system described above is a color imbalance that is caused by the asymmetry in brightness distribution of each of the component colors, i.e., red and blue from the cathode-ray tubes oriented obliquely. That is, the brightness of the red image is greater on the left side 33 than on the right side 34, and the brightness of the blue image is greater on the right side 34 than on the left side 33. When the intensity of the images displayed on the cathode-ray tubes are so adjusted that a color balance is achieved at the center of the screen, the color imbalance of opposite tendencies appear on the opposite sides of the screen.

One reason for the asymmetric distribution of each of the red and blue images is that the field angles $\omega_1$ and $\omega_2$ on the respective sides differ from each other. As is known, the density of light flux (rays) is decreased with the angle formed by the light ray reaching the point in question and the optical axis. This leads to the asymmetric distribution of the brightness (illuminance) on the rear surface 32 of the screen 30, and hence the brightness (luminance) of the image as seen on the front surface 31 of the screen 30.

Further description on the asymmetric distribution of the brightness will be given with reference to FIG. 2.

Figure 2:
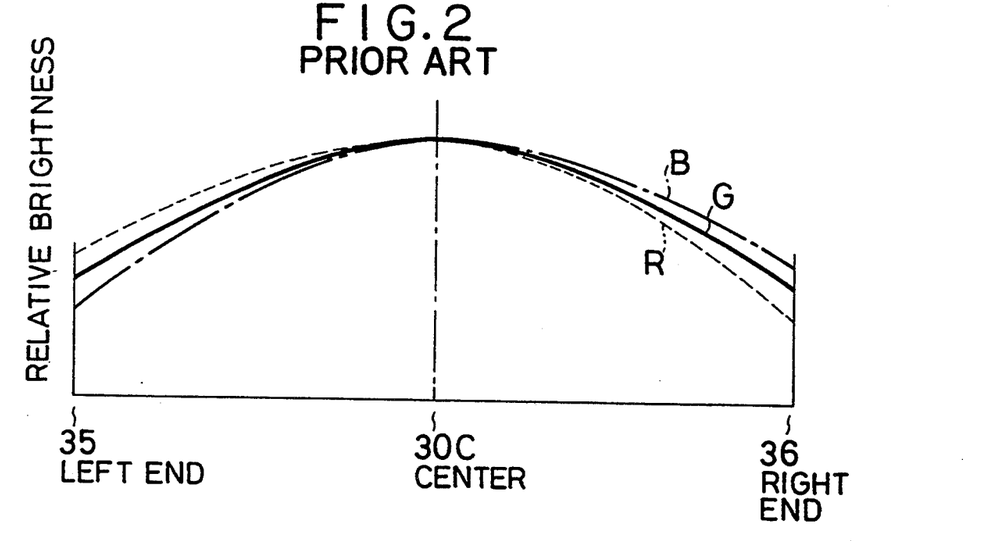
FIG. 2 is a graph showing the relative brightness of the respective points on the screen.
Figure 3:
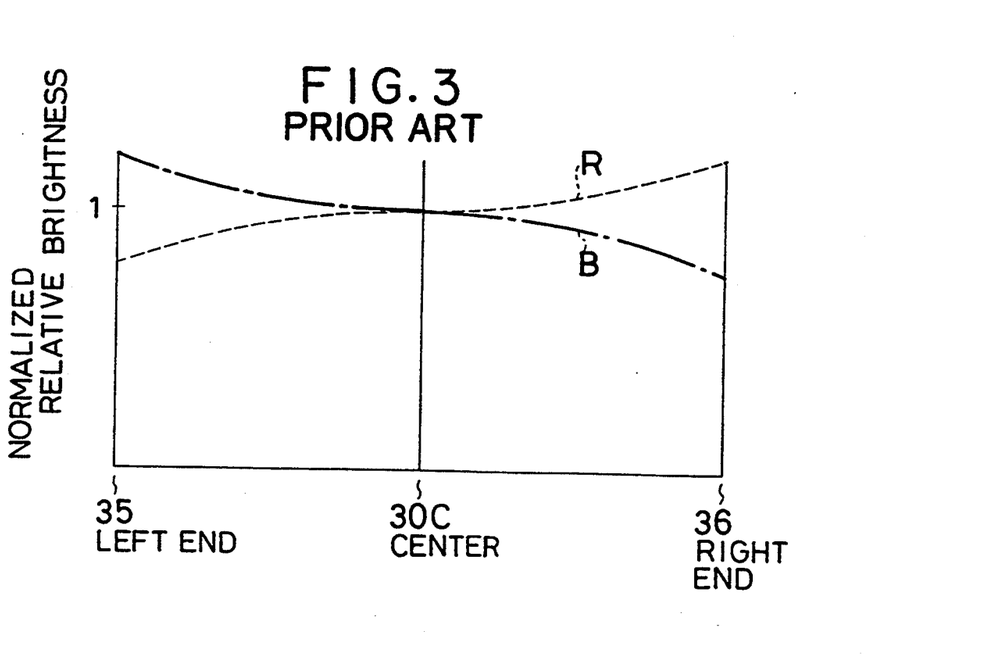
FIG. 3 is a graph showing the normalized relative brightness of the images of the respective colors.

As shown in FIG. 2, the brightness of the green image is maximum at the center 30C of the screen 30 and decreases with the distance from the center 30C, symmetrically about the center. The brightness of the red and blue images are asymmetrical about the center 30C. The brightness of the red and blue images as normalized with respect to the brightness of the green image, at the respective points on the screen, is as shown in FIG. 3. The brightness of the red image as normalized with reference to the brightness of the green image increases toward the left end 35 and decreases toward the right end 36. The brightness of the blue image as normalized with reference to the brightness of the green image increases toward the right end 36 and decreases toward the left end 35. The normalized brightness can be used as a basis on which to make judgement as to whether or not the color balance is attained, or as a parameter reflecting color balance or imbalance.

Figure 4:
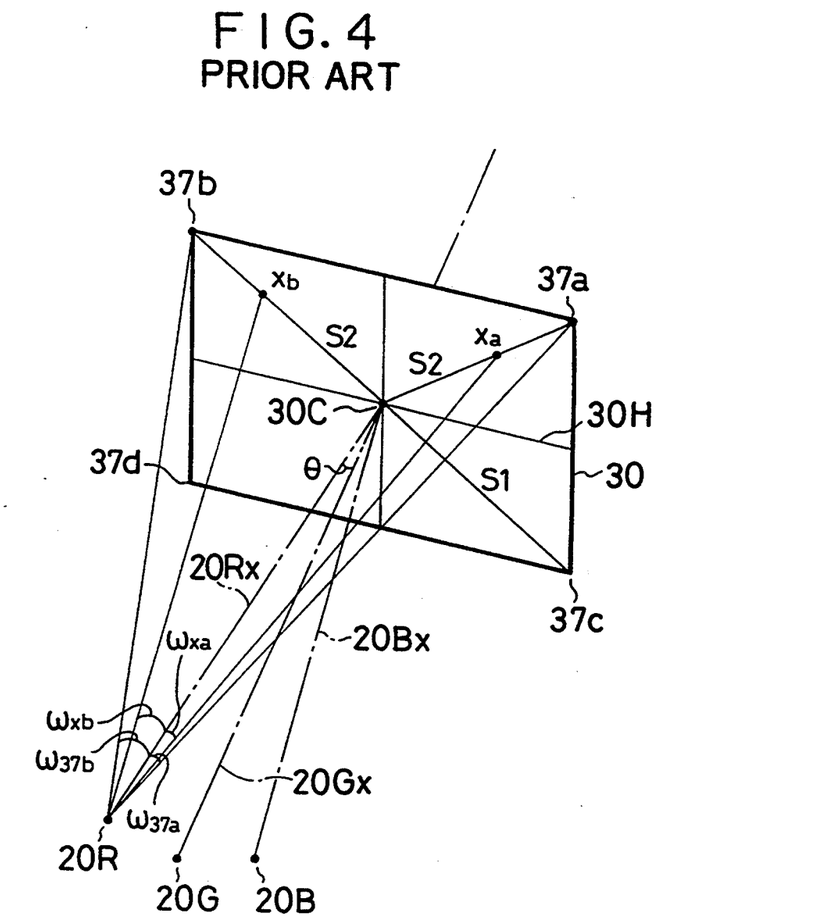
FIG. 4 is a schematic perspective view showing the field angles at the corners of the screen.

As is better seen from FIG. 4, the difference between field angles is greater between the corners of the screen. For instance, the normalized brightness of the red image increases toward the upper-left corner 37a and toward the lower-left corner 37c, and decreases toward the upper-right corner 37b and toward the lower-right corner 37d. The normalized brightness of the blue image increases toward the upper-right corner 37b and toward the lower-right corner 37d, and decreases toward the upper-left corner 37a and lower-left corner 37c. The field angles of the red image at the upper-left corner 37a and the upper-right corner 37b are indicated by $\omega_{37a}$ and $\omega_{37b}$.

The angle of convergence, $\theta$, is increased as the distance from the screen to the cathode-ray tubes is decreased for reduction in size of the system. Thus, the above problem imposes a limitation to the size reduction.

Another reason for tile asymmetric distribution of the brightness (luminance) of the image of each color on the screen as seen from the viewers on the front side 31 of the screen 30, is that the transmittance of the screen 30 differs depending on the angle of incidence of light.

A method for compensating for the color imbalance is to partially increase or decrease the beam drive current (which determines the intensity of the beam impinging the fluorescent surface In the cathode-ray tube) thereby to vary the brightness of the image on the cathode-ray tubes. But increasing the beam drive current increases the size of the beam spot on the fluorescent surface, resulting in degradation in the resolution. On the other hand, partially decreasing the beam drive current decreases the average brightness of the Image on the screen.

SUMMARY OF THE INVENTION

An object of the invention is to reduce the imbalance in the colors.

A projection television system according to a first aspect of the invention comprises:

a plurality of display elements respectively displaying images of respective colors;

a screen on which a color image formed by magnifying and synthesizing the images of the respective colors is projected;

projection lenses provided for the respective display elements for magnifying the images of the respective colors displayed on the respective display elements and projecting them onto the screen thereby to form said color image;

a first one of the lenses being disposed so that its optical axis is incident on a reference point on the screen;

each of at least one other lens being disposed so that its optical axis is incident on the screen with an angle with respect the optical axis of the first lens;

wherein the optical axis of said at least one other lens is incident on the screen at a point different from said reference point so that a difference in normalized brightness between a point of concern and said reference point is reduced, with said normalized brightness being defined as a ratio of the brightness of the image projected onto a given point on the screen by said at least one other lens to the brightness of the image projected onto said given point by said first one of the lenses.

A projection television system according to a second aspect of the invention comprises:

a plurality of display elements respectively displaying images of respective colors;

a screen on which a color image formed by magnifying and synthesizing the images of the respective color is projected;

projection lenses provided for the respective display elements for magnifying the images displayed on the respective display elements and projecting them onto the screen thereby to form said color image;

a first one of the lenses being disposed so that its optical axis is incident on a reference point on the screen;

each of at least one other lens being disposed so that its optical axis is incident on the screen with an angle with respect the optical axis of the first lens;

wherein at least one of said display elements is provided with a filter having a transmittance varied from one position to another such that normalized brightness is substantially uniform throughout the entire screen, with said normalized brightness being defined as a ratio of the brightness of the image projected onto a given point on the screen by said at least one other lens to the brightness of the image projected onto said given point by said first one of the lenses. These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

EMBODIMENT 1

Figure 5:
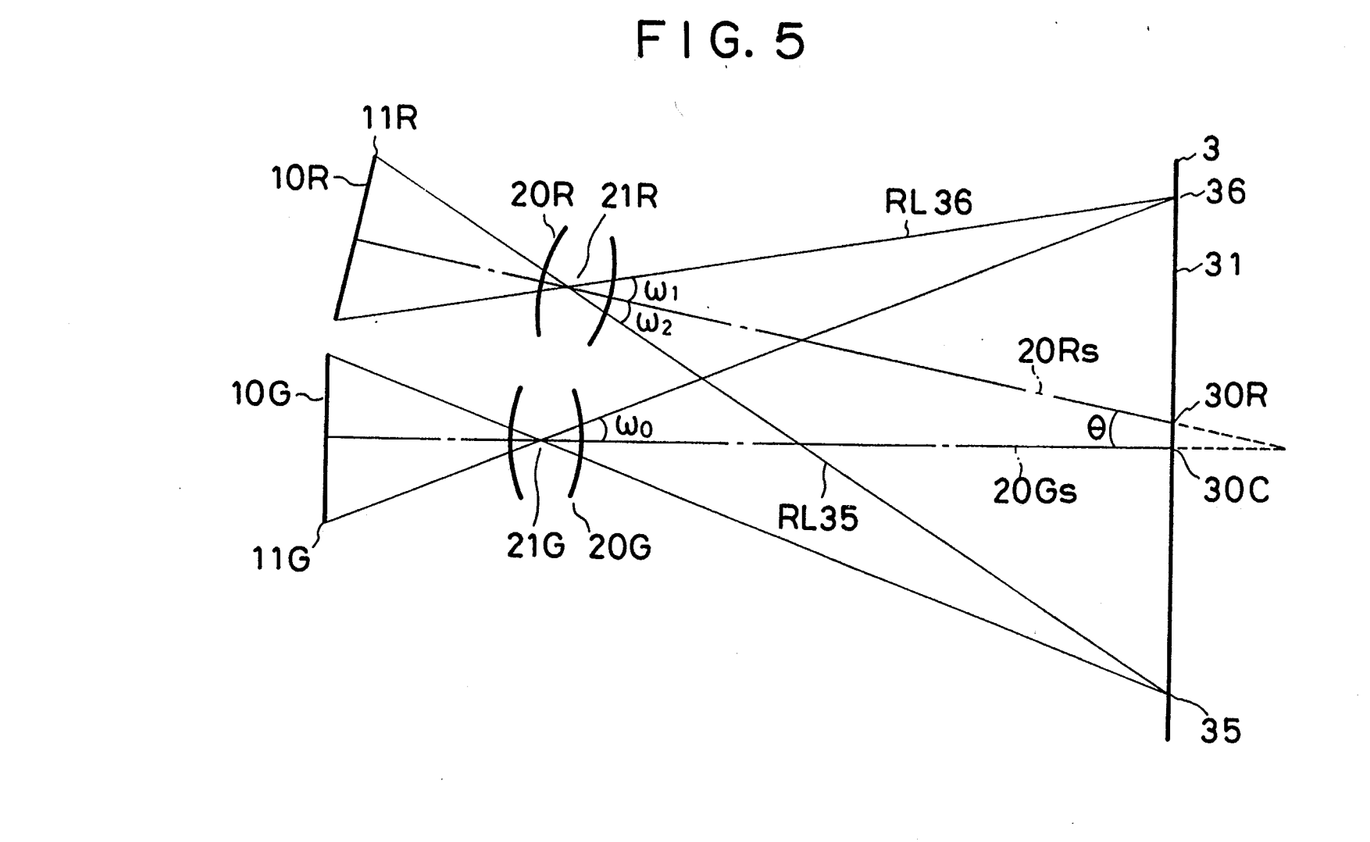
FIG. 5 is a schematic plan view showing an embodiment of the invention.

A first embodiment of the invention will now be described with reference to FIG. 5. For the simplicity of illustration, only green and red cathode-ray tubes 10G and 10R and green and red lenses 20G and 20R are shown. It should be understood that a blue cathode-ray tube (similar to the blue cathode-ray tube 10B in FIG. 1) and a blue lens (similar to the blue lens 20B in FIG. 1) are disposed at the opposite side of the red cathode-ray tube 10R and the red lens 20R.

The optical axis 20Gs of the green lens 20G is normal to the surface of the screen 30 and is incident at the center 30C of the screen 30. The optical axis 20Rs of the red lens 20R is at an angle with respect to the optical axis 20Gs of the green lens 20G and is incident at a point offset from the center 30C of the screen 30. Specifically, the incident point is toward the side on which the red cathode-ray tube 10R and the red lens 20R are disposed. As a result, the convergence angle $\theta$ is reduced. The incident point 30R is so determined that the field angle $\omega_1$ formed between the optical axis 20Rs and light ray RL36 from the exit pupil 21R to a right end 36 of a central horizontal line 30H passing the center 30C of the screen 30, and the field angle $\omega_2$ formed between the optical axis 20Rs and the light ray RL35 from the exit pupil 21R to a left end 35 of the central horizontal line 30H are substantially equal to each other. As the field angles are substantially equal, the brightness of the red image is substantially equal on the left and right sides. As a result, a ratio of the brightness of the red image to the brightness of the green image is substantially equal between each of the ends 35 and 36 and the center 30C of the screen 30. This ratio is called a normalized brightness.

A similar correction is made on the blue projection system.

EMBODIMENT 2

In describing Embodiment 1, it is assumed that the brightness (luminance) of the image as seen on the front side 31 of the screen 30 is proportional (possibly with negligible deviation) to the brightness (illuminance) of the image as projected on the rear side 32 of the screen 30.

A problem yet unsolved by Embodiment 1 is that the transmittance of the screen 30 may differ depending on the angle of incidence of light, and the distribution of the transmittance for the image of each color is asymmetric. That is, where the angle of incidence (the angle of the incident light ray with reference to the line normal to the surface on which the light ray is incident) of the light ray RL36 from the red cathode-ray tube to the point 36 is small, the transmittance of the screen 30 is small, and the red image is darker to the viewer seeing the front surface 31 of the screen 30. On the other hand, where the angle of incidence of the light ray RL35 from the red cathode-ray tube 10R to the point 35 is large, the transmittance of the screen 30 is large, and the red image is brighter to the viewer seeing the front surface 31 of the screen. This also contributes to a color imbalance of opposite tendencies at the opposite sides of the screen. To eliminate the color imbalance due to this difference in transmittance, the incident point 30R can be adjusted such that the field angle $\omega_1$ is smaller than the field angle $\omega_2$ so that the brightness distribution of the red image as seen on the front side 31 of the screen 30 is symmetric, taking account of the difference in transmittance.

A similar adjustment is made on the blue projection system.

EMBODIMENT 3

In the embodiments described above, the incident point is so determined that the difference in brightness of the image of each color between the left and right ends 35 and 36 of a central horizontal line (30H in FIG. 4) passing the center of the screen 30 is reduced or minimized. In this embodiment, the incident points are so determined that the difference in brightness of the image of each color between the corners of the screen is reduced or minimized. For instance, in the same way as in Embodiment 1, the incident point 30R is so determined that the field angle $\omega_{37a}$ formed between the optical axis 20Rx and the light ray to the upper-left corner 37a (FIG. 4), and the field angle $\omega_{37b}$ formed between the optical axis 20Rx and the light ray to the upper-right corner 37b are substantially equal to each other, and that the field angle formed between the optical axis 20Rx and the light ray to the lower-left corner 37c, and the field angle formed between the optical axis 20Rx and the light ray to the lower-left corner 37d are substantially equal to each other.

Figure 6:
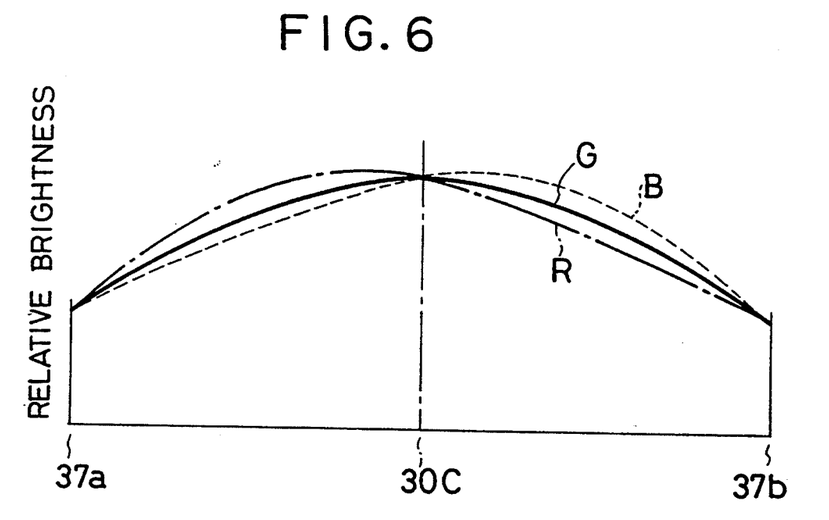
FIG. 6 is a graph showing the relative brightness distribution along the diagonal line of the screen.
Figure 7:
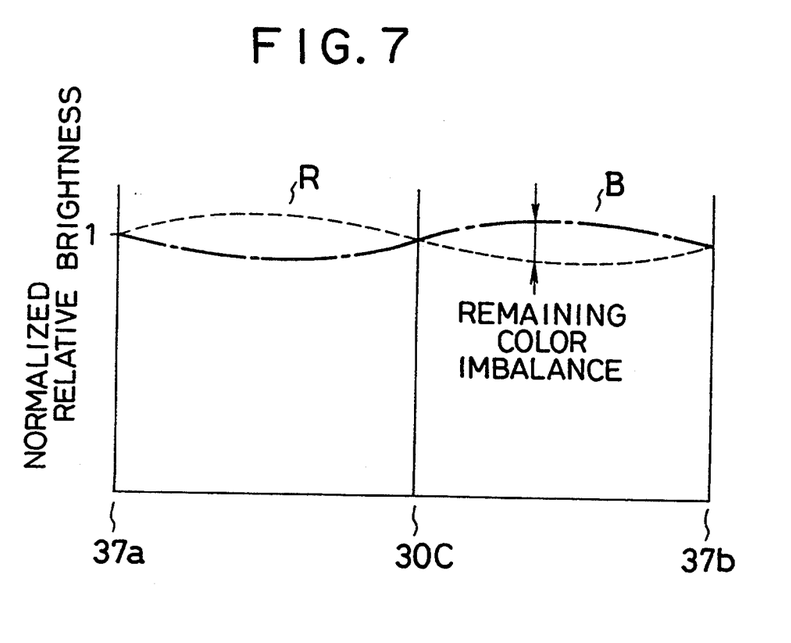
FIG. 7 is another graph showing the normalized relative brightness as normalized with reference to the relative brightness of the green image.

The brightness distribution along the line (diagonal line) connecting the center 30C of the screen 30 and any of the corners is shown in FIG. 6 and FIG. 7. In both of FIG. 6 and FIG. 7, the horizontal axis represents the position on the screen with respect to the center 30C. In FIG. 6, the vertical axis represents the brightness (relative brightness) of green, red and blue images at the respective position, given as a ratio to the brightness of the respective images at the center. In FIG. 7, the vertical axis represents the relative brightness (normalized relative brightness of red and blue images at the respective point normalized with reference to the relative brightness of green image, and, on the horizontal axis, at the same position.

EMBODIMENT 4

As a modification to Embodiment 3, the incident point may additionally be so adjusted that the brightness are equal at the corners taking account of the differences in the transmittance at the corners, like Embodiment 2 described above.

EMBODIMENT 5

Figure 8:
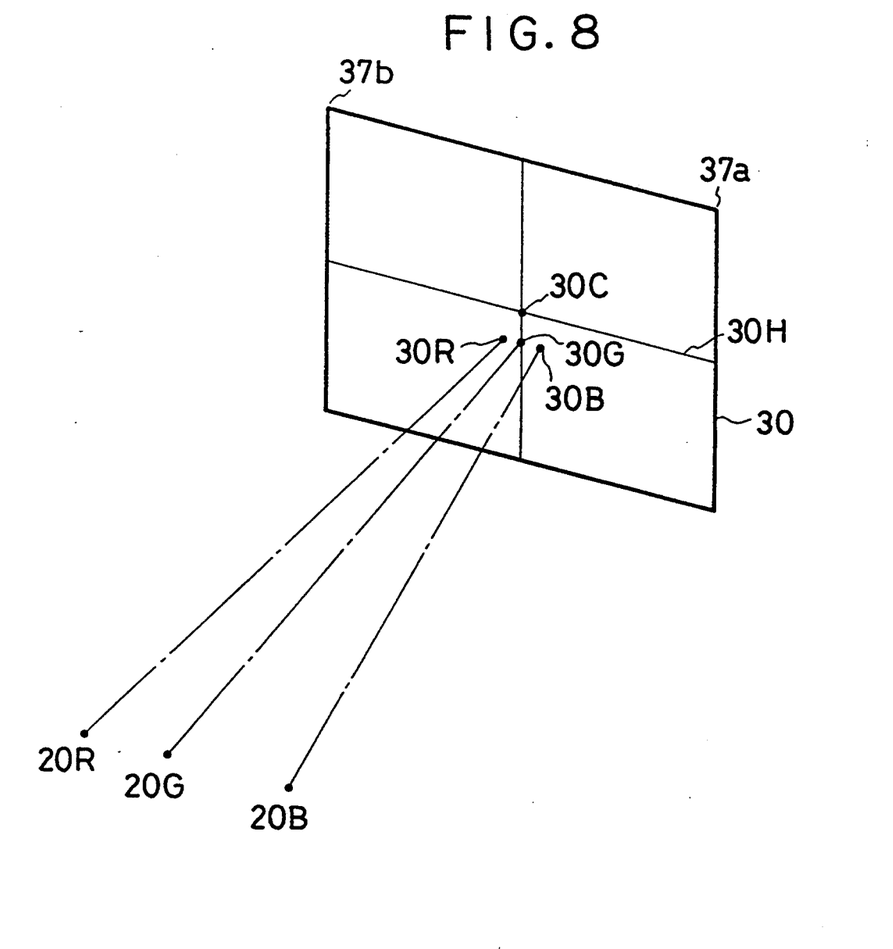
FIG. 8 is a perspective view showing another embodiment of the invention.

In the above embodiments, the optical axes are incident on the screen within a horizontal plane containing a central horizontal line 30H (FIG. 4) passing the center 30C of the screen, and the incident points of the optical axes are on the central horizontal line 30H. Where the optical axes are incident at an angle with respect to the horizontal plane, the incident points of the optical axes of the red lens 20R and the blue lens 20B may be at a point offset from central horizontal line 30H, as shown in FIG. 8.

According to Embodiments 1 to 5 described above, the incident point of the optical axis of the lens for each color is so determined that the field angles at the ends of the central horizontal line or at corners are substantially equal, or are so determined that the brightness of each color is substantially equal between the ends of the central horizontal line or between the corners taking account of the difference in transmittance depending on the angle of incidence on the screen 30. Accordingly, symmetry of the brightness of the image of each color is reduced, and color imbalance is reduced. It is therefore possible to enlarge the converging angle and to reduce the size of the system.

EMBODIMENT 6

Figure 9:
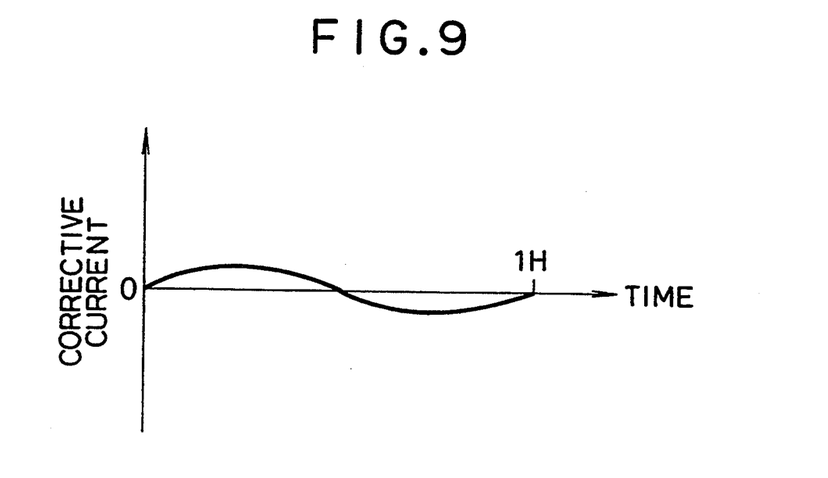
FIG. 9 is a diagram showing a waveform of a corrective current.

In Embodiment 3, the optical axes are so determined that the difference in brightness of the image of each color between the corners is reduced or eliminated. However, as illustrated in FIG. 7, the color imbalance is present at the positions other than the corners. This color imbalance can however be eliminated by providing cathode-ray tubes with respective drive current generating circuits 15R, 15G and 15B having a function of correcting the color imbalance. This circuit modifies a beam drive current for determining the intensity of the beam with a corrective current having a period of 1H (horizontal period) and having its instantaneous value periodically varying, as shown in FIG. 9 to cancel the variation in the normalized brightness along the horizontal lines on the screen corresponding to the horizontal scan lines on the cathode-ray tube. Since the amount of color imbalance to be corrected by the drive current generating circuits are much smaller than in the prior art shown in FIG. 3, increase in the beam spot diameter is restrained, and reduction in the resolution is therefore minimized.

For simpler designing, the corrective current may have its instantaneous value varying in opposite relation to the normalized brightness variation along the diagonal line shown in FIG. 7.

EMBODIMENT 7

Modification as described at Embodiment 6 above may be applied to Embodiment 1. That is, where the optical axes are so disposed that the brightness of the image of each color is equal between the two ends of the central horizontal line, the cathode-ray tubes may be provided with a drive current generating circuit which is so designed to have a function of generating a beam drive current modified with a corrective current having a period of 1H (horizontal period) and having its instantaneous value periodically varying to cancel the variation in the normalized brightness along the horizontal lines on the screen corresponding to the horizontal scan lines on the cathode-ray tube.

For simpler designing, the corrective current may have its instantaneous value varying in opposite relation to the normalized variation along the central horizontal line.

EMBODIMENT 8

Figure 10:
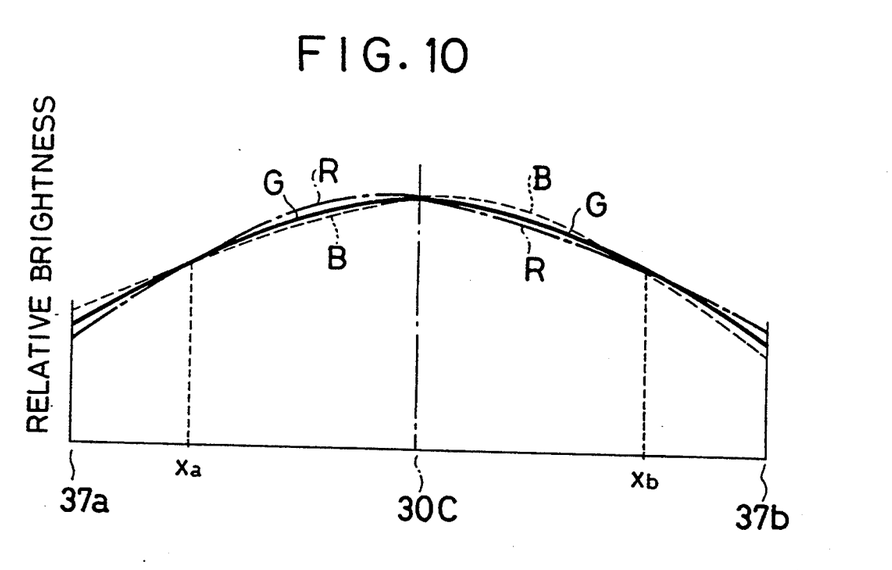
FIG. 10 is a graph showing the relative brightness distribution along the diagonal line of the screen in an embodiment of the invention.
Figure 11:
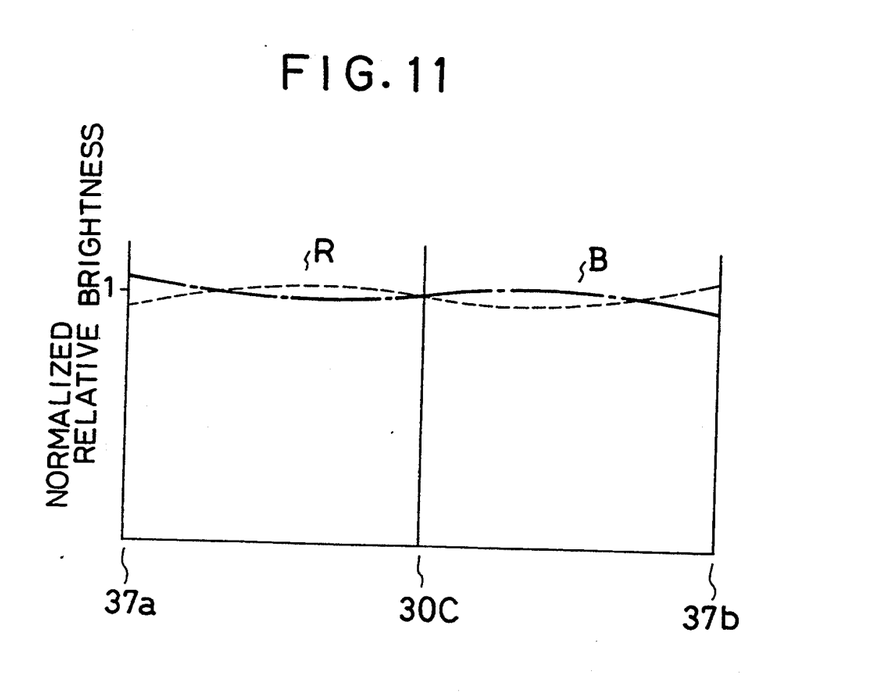
FIG. 11 is another graph showing the normalized relative brightness as normalized with reference to the relative brightness of the green image.

In Embodiments 1 and 3, the optical axes are disposed to eliminate the color imbalance at the ends of the central horizontal line or at the corners, respectively. The optical axes may alternatively be so disposed that the brightness of each color is substantially equal between any points of concern other than the ends of the central horizontal line or at the corners, and equal in distance from the center 30C of the screen 30. With this embodiment, the brightness (normalized brightness) of the red and blue images as normalized with the brightness of the green image is designed to be reversed at the points of concern, xa or xb, in FIG. 10. For instance, the relative brightness of the red image is larger than the relative brightness of the green image from the center 30C up to the point xa and is smaller at the points farther from the center 30C than the point xa. In the opposite side of the screen 30, the brightness of the red image is smaller than the relative brightness of the green image from the center 30C up to the point xb and is larger at the points farther from the center 30C than the point xb. The relative brightness of the blue image as normalized with reference to the relative brightness of the green image is similarly reversed at point xa or xb, as shown in FIG. 11. It will be seen that the maximum difference is smaller than in Embodiment 1 or 3.

In this embodiment, it is also possible to use in combination a drive current generating circuit which is so designed to produce a beam drive current with a corrective current to cancel tile difference in brightness between points other than said points of the equal distance.

It is however also possible to eliminate the use of the corrective current if the difference in brightness is small enough. It has been confirmed that if the difference in normalized relative brightness between the red and blue images are not more than 7% with reference to the green image, the color imbalance is not discernible and is therefore acceptable. It has been found that the difference in the normalized relative brightness is restrained if the point of concern is set to satisfy the following relationship. That is, $$0.5 < s2/s1 < 0.9$$

where
s1 represents the distance from the center of the screen to the corner; and
s2 represents the distance from the center of the screen to the point of concern at which the normalized relative brightness is made equal.

In other words, if the effect of the difference of the transmittance depending on the angle of incidence (as discussed above, for example in relation to Embodiment 2) is neglected, and the effect of tile field angle alone is taken account of, the angle $\omega_{11}$ between the red light ray incident on the position xa and the optical axis and the angle $\omega_{22}$ between tile red light ray incident on the position xb and the optical axis are equal to each other.

In addition, condition similar to the above is also met with respect to the color image of blue.

With such an arrangement, the correction by the drive current generating means can be dispensed with.

When s2 exceeds the upper limit as specified by the above inequality, tile color imbalance is large in the central part of the screen 30. When s2 is below the lower limit, the color imbalance is large at the corners.

EMBODIMENT 10

What follows is a description of further embodiments which utilize a filter provided on the cathode-ray tube to compensate for the difference in the brightness of the image of each color due to the difference in the field angle. The filter may be a multi-layer filter, such as a dielectric multi-layer filter or an ND (neutral density) filter. First, an embodiment using a dielectric multi-layer filter will be described.

Figure 12:
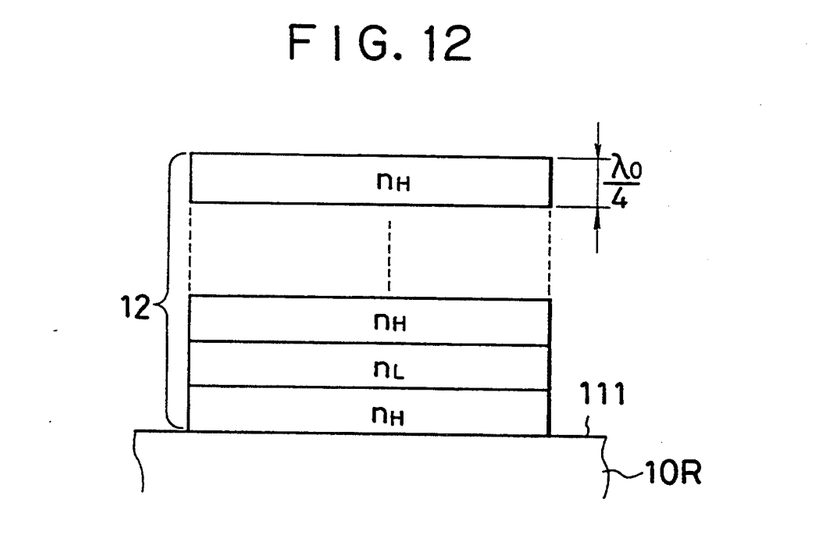
FIG. 12 is a sectional view of a multi-layer filter.
Figure 13:
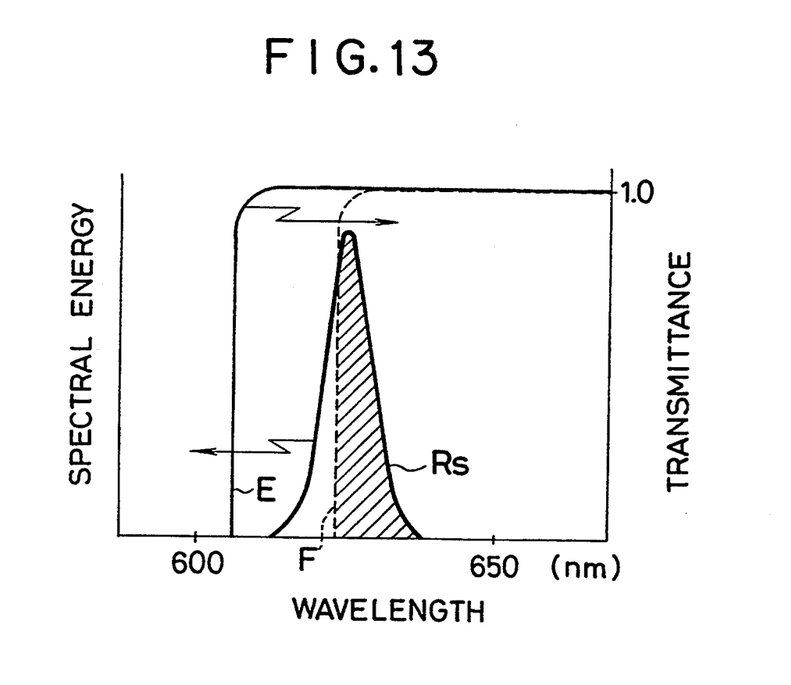
FIG. 13 is an explanatory diagram illustrating the transmittance of the multi-layer filter.

As shown in FIG. 12, a dielectric multi-layer filter 112 comprising optical-layers of a thickness which is so set at a quarter of tile reference wavelength $\lambda_0$, the spectral transmittance characteristics is as shown by the solid line E in FIG. 13 for red light having a spectral energy as shown by the solid line Rs.

Figure 14:
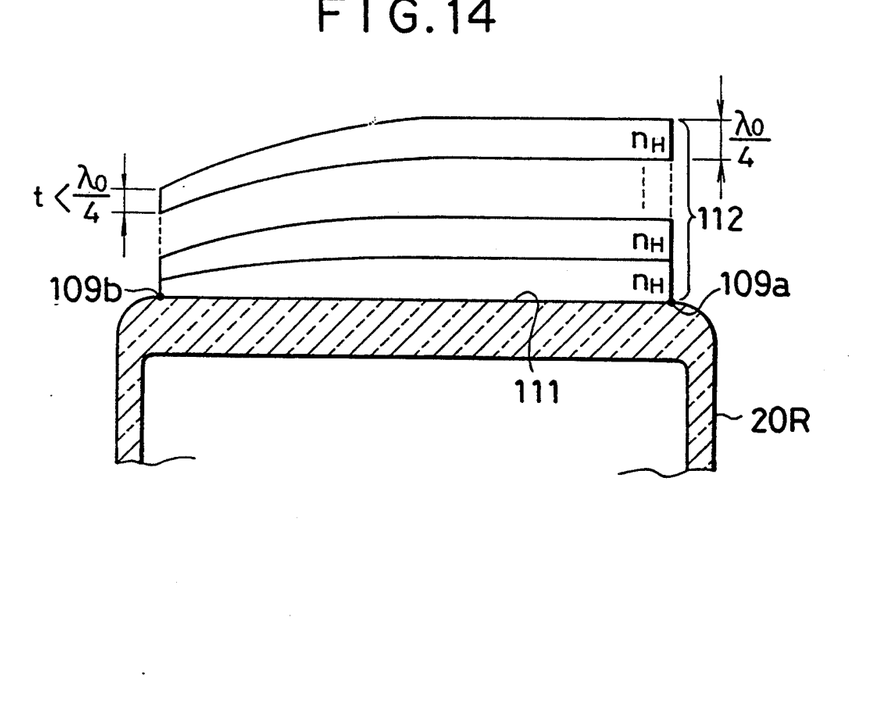
FIG. 14 is an enlarged sectional view showing a dielectric multi-layer filter as used in an embodiment of the invention.

If this dielectric multi-layer filter 112 is applied on the side 109a of the face-plate 111 in FIG. 14, substantially all tile light flux emitted from the side 109a transmit through the dielectric multi-layer filter 112.

If the thickness t of each layer of the dielectric multi-layer filter 112 is made smaller than $\lambda_0/4$ on the side 109b, the spectral transmittance is as shown by the broken line F in FIG. 13. Thus, the transmittance is less than 100%.

Figure 15:
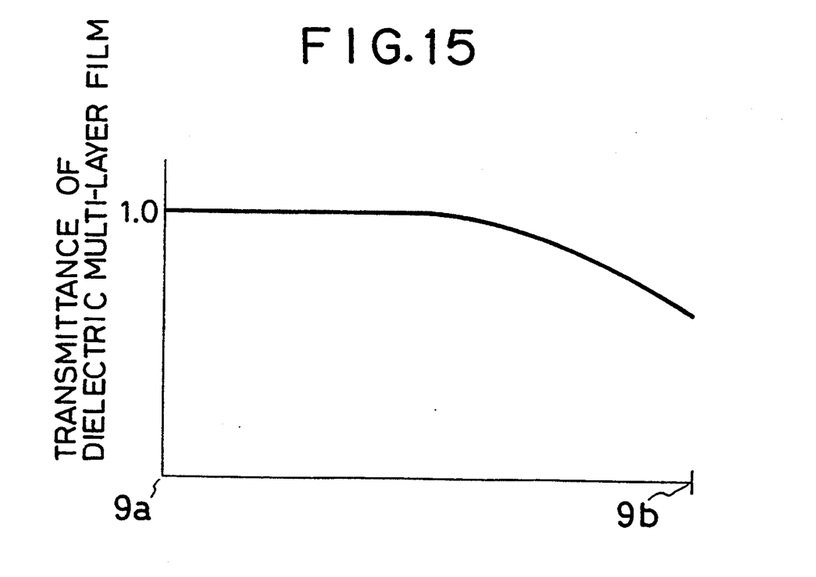
FIG. 15 is a diagram showing the transmittance characteristics of the dielectric multi-layer filter.

By gradually changing the thickness of each layer of the dielectric multi-layer filter 112 from the side 109a to the side 109b as shown In FIG. 14, the transmittance is varied gradually from one side to the other side of the display surface as shown in FIG. 15.

Figure 16:
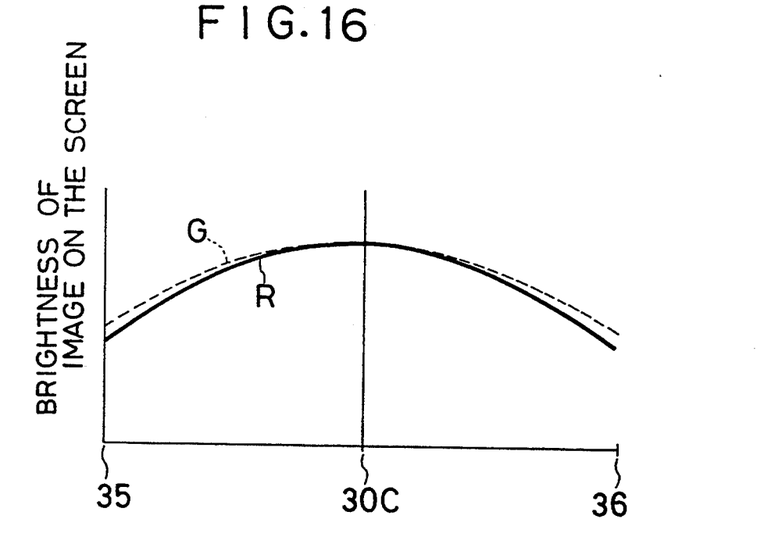
FIG. 16 is a diagram showing the relative brightness distribution of the screen.

This variation in the transmittance compensates for the variation in the normalized relative brightness of the red image due to difference in the field angle and thereby to make it uniform throughout the entire screen. In addition, the symmetry in the brightness on the screen with respect to the center of the screen is improved as shown in FIG. 16.

Figure 17:
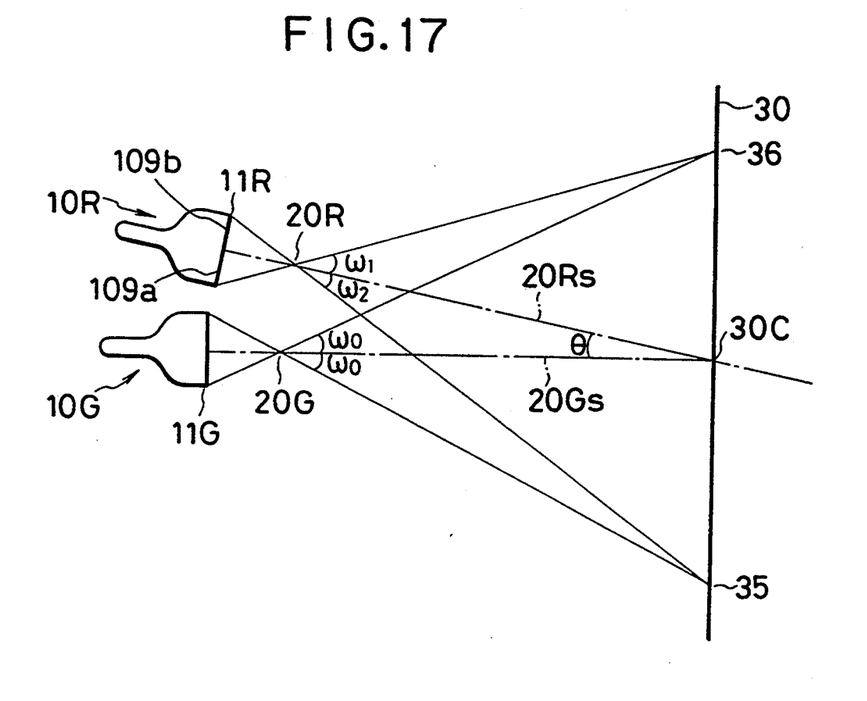
FIG. 17 is a diagram showing an arrangement of cathode ray tubes and projection lenses in a further embodiment of the invention.

In the above embodiment, the thickness of each layer of the dielectric multi-layer filter is so varied that the variation in its transmittance compensate for the difference in the normalized relative brightness of the red image due to the difference in the field angle. However, the compensation may be made taking account of the variation in the transmittance through the screen due to the difference in the incident angle. Specifically, the transmittance is made even greater on the side 109a emitting the light ray that is incident on the side 36 on the screen as shown in FIG. 17, where the incident angle is smaller. That is, the compensation may be so made that the transmittance through the dielectric multi-layer filter on the side 109a emitting the light which reaches the screen on the side 36 is larger, and the transmittance through the dielectric multi-layer filter on the side 109b emitting the light which reaches the screen on the side 35 is smaller.

Similar compensation is made for the blue image by providing a dielectric multi-layer filter on the display surface of the blue cathode-ray tube. The thickness of each layer of the dielectric multi-layer filter is so varied that the transmittance of the blue light is varied to compensate for the variation in normalized relative brightness of the blue image due to the field angle of the light from the blue cathode-ray tube. The thickness of each layer of the dielectric multi-layer filter may additionally be so varied that the transmittance of the blue light is varied to compensate for the variation in normalized relative brightness of the blue image due to the transmittance related to the angle of incidence on the screen.

In the embodiments described above, the transmittance distribution of the dielectric multi-layer filter is so determined that the brightness of the image of each color is substantially equal between both sides 35 and 36, i.e., between both ends of the central horizontal line 30H. The transmittance distribution of the dielectric multi-layer filter may alternatively or additionally be so determined that the brightness of the image of each color is equal between the corners of the screen.

In the embodiments described, the optical axis is within the plane including the horizontal line passing the center of the screen and normal to the screen. The invention is applicable to a situation where the optical axis is at an angle with respect to the above mentioned plane. In such a case, the transmittance of the dielectric multi-layer filter may vary depending on the vertical position (position along the line perpendicular to the horizontal line) on the display surface as well as the lateral position (position along the horizontal line) on the display surface so that the difference in brightness of the image of each color due to the difference in field angle for varying vertical as well as horizontal position is compensated for.

The description of Embodiment 10 has been made in connection with an optical system in which the optical axes of the red, blue and green lenses are all incident at the center of the screen. But the invention is applicable to a system where the optical axes are incident on the screen at a position offset from the center.

Figure 18:
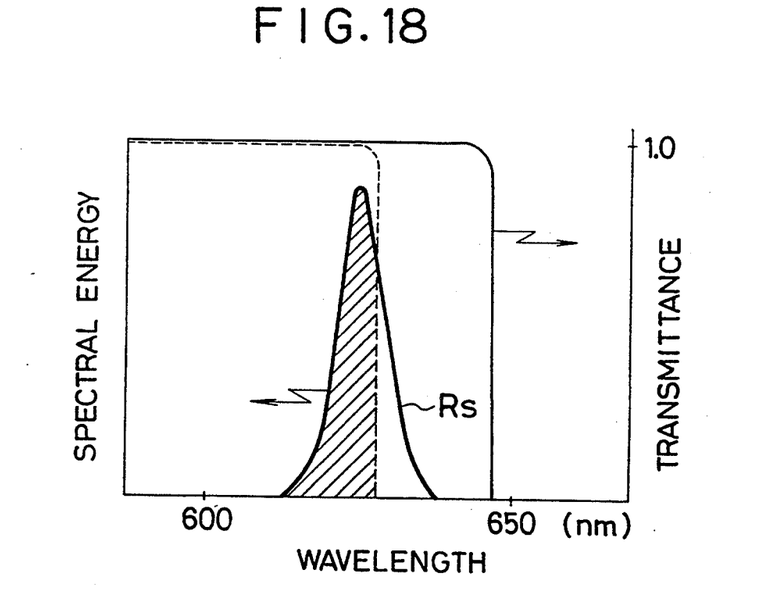
FIG. 18 is an explanatory diagram for illustrating the effect of a modification of a dielectric multi-layer filter.

In the embodiments described above, the dielectric multi-layer filter 112 is made to serve as a filter permitting passage of light components having wavelengths longer than the spectral distribution of the red light. It is however possible to design the dielectric multi-layer filter 12 to serve as a filter permitting passage of light components having wavelengths shorter than the spectral distribution of the red light, as illustrated in FIG. 18. In this case, the thickness t of each layer of the filter on the side 109b is made greater than $\lambda_0/4$.

In the embodiments described above, description is made on the red projection system. Similar measures may of course be taken on the blue projection system. That is, a dielectric multi-layer filter having a transmittance varied from one part to another to compensate for the variation in the brightness of the blue image on the screen due to the variation in field angle and/or the difference in the transmittance through the screen due to the difference in the incident angle may be formed on the surface of the face-plate 111 of the blue cathode-ray tube.

In the above embodiments, the multi-layer filter is provided on the front surface of the face-plate 111 of the CRT. Alternatively, it may be formed on the rear side of the face-plate 111.

In the embodiments described, each of the display elements are comprised of a cathode-ray tube. Other types of display elements, such as liquid-crystal displays, may alternatively be used.

EMBODIMENT 11

Figure 19:
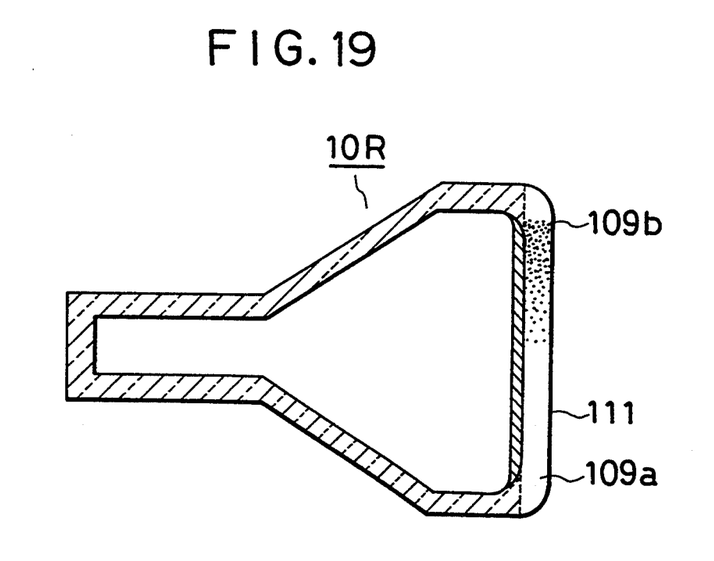
FIG. 19 is a partial enlarged sectional view of a faceplate used in another embodiment of the invention.

In a further embodiment of the invention, shown in FIG. 19, the face-plate 111 is formed of an ND (neutral density) filter having a transmittance varied from one position to another, as shown in FIG. 15, to compensate for the variation in the normalized relative brightness and/or the transmittance of the screen. In the illustrated embodiment, the transmittance is higher on the side 109a and is lower on the side 109b.

It is also possible with this arrangement to realize a brightness distribution which is symmetrical about the center, as shown in FIG. 16.

Instead of forming the face-plate with the ND filter, a filter forming an ND filter may be formed on the face-plate 111.

With the arrangement described above, the symmetry in the color brightness is improved.

What is claimed is:

1. A projection television system comprising:
    a plurality of display elements, each respectively displaying images of a different one of a plurality of respective colors;
    a screen having a front surface seen by a viewer and a rear surface onto which a color image, formed by magnifying and synthesizing the display images of the respective colors, is projected, transmittance of said screen being small at a small angle of incidence of a light ray and large at a large angle of incidence of a light ray;
    projection lenses, provided for the respective display elements, for magnifying the display images of the respective colors displayed on the respective display elements and for projecting the display images onto the rear surface of the screen to form the color image;
    a first one of the projection lenses being disposed so that its corresponding optical axis is incident to a reference point on the screen;
    at least one of the other projection lenses being disposed so that its corresponding optical axis is incident to the screen at an angle with respect to the optical axis of the first projection lens;
    wherein the optical axis of said at least one of the other projection lenses is incident to the screen at a point offset from said reference point, and wherein a first field angle of at least one of the projection lenses, formed by its optical axis and an axis incident to a point proximate to a horizontal end of the screen closest to its corresponding projection lens, is less than a second field angle of the at least one projection lens, formed by its optical axis and an axis incident to a point proximate to a horizontal end of the screen furthest from its corresponding projection lens, so that a difference in normalized brightness between a point of concern and said reference point is reduced, with said normalized brightness being a normalized brightness of the image as seen on the front surface of the screen opposite to the rear surface of the screen, taking into account a difference in transmittance of the light image through the screen depending on a difference in the angle at which projected light rays are incident and said normalized brightness being defined as a ratio of the brightness of the image formed onto a point on the front surface of the screen by said at least one of the other projection lenses to the brightness of the image formed onto said given point by said first one of the projection lenses.

2. The system of claim 1, wherein said offset point incident to the screen is on a horizontal line passing through the reference point.

3. The system of claim 1, wherein said offset point incident to the screen and the points proximate to the horizontal ends of the screen are on a horizontal line passing through the reference point.

4. The system of claim 1, wherein said points proximate to the horizontal ends of the screen are at corners of the screen.

5. The system of claim 1, wherein the optical axis of the first lens is incident to the screen at a point offset from said reference point.

6. The system of claim 1, wherein said reference point is substantially at a center of the screen.

7. The system of claim 1, wherein said display elements are for displaying images of three primary colors.

8. The system of claim 1, wherein the projection lenses are disposed so that corresponding optical axes are each at an angle with respect to a plane perpendicular to the screen and containing a horizontal line in the screen, and said at least one projection lens is so disposed that its corresponding optical axis is incident to the screen at a point offset from a horizontal line containing said reference point.

9. The system of claim 1, further comprising means for driving the display elements with a drive current as modified with a corrective current for eliminating further difference in the normalized brightness remaining despite the incident optical axes.

10. The projection television system of claim 1,
wherein said reference point is substantially at the center of the screen; and
points of concern are on diagonal lines connecting the center of the screen and four corners of the screen, and at a distance s2 from the center, with the distance s2 satisfying the following relationship:

$$0.5 < s2/s1 < 0.9$$

where s1 represents the distance from the center of the screen to the corner.

11. The system of claim 5, wherein said offset point incident to the screen, corresponding to the optical axis of said at least one of the other projection lenses, and the offset point incident to the screen, corresponding to the optical axis of said first projection lens, are on a horizontal line offset from said reference point.

12. The system of claim 11, wherein the reference point is substantially at a center of the screen.

13. The system of claim 1, wherein at least one of said display elements is provided with a filter having a transmittance varied from one position to another such that normalized brightness is substantially uniform throughout the entire screen, with said normalized brightness being defined as a ratio of the brightness of the image projected onto a given point on the screen by said at least one of the other projection lenses to the brightness of the image projected onto said given point by said first projection lens.

14. A projection television system comprising:
a plurality of display elements, each respectively displaying images of a different one of a plurality of respective colors;
a screen, onto which a color image, formed by magnifying and synthesizing the display images of the respective colors, is projected;
projection lenses, provided for the respective display elements for magnifying the display images displayed on the respective display elements and for projecting the display images onto the screen to form the color image;
a first one of the projection lenses being disposed so that its corresponding optical axis is incident at a point offset from a reference point at the center of the screen;
at least one of the other project lenses being disposed that its corresponding optical axis is incident to the screen at an angle with respect to the optical axis of the first project lens and at a point offset from a reference point of the center of the screen;
the optical axes of the first one of the projection lenses and the other projection lenses each being incident at points aligned on a horizontal line offset from the reference point of the center of the screen;
wherein at least one of said display elements is provided with a filter having a transmittance varied from one position to another such that normalized brightness is substantially uniform throughout the entire screen, with said normalized brightness being defined as a ratio of the brightness of the image projected onto a given point on the screen by said at least one of the other projection lenses to the brightness of the image projected onto said given point by said first projection lens.

15. The system according to claim 14, wherein said difference in the brightness of the images of the respective color is due to difference in field angle.

16. The system according to claim 14, wherein said normalized brightness is a normalized brightness of the image as seen on a surface of the screen opposite to a surface of the screen on which the images are projected, taking into account a difference in transmittance of the light image through the screen depending on a difference in the angle at which projected light rays are incident.

17. The system of claim 14, wherein said filter having the varied transmittance is a multi-layer filter.

18. The system of claim 17, wherein said multi-layer filter is a dielectric multi-layer filter.

19. The system of claim 17, wherein said multi-layer filter is formed on a face-plate of a cathode-ray tube.

20. The system of claim 14, wherein said filter having the varied transmittance is an ND filter.

21. The system of claim 20, wherein the face-plate forms said ND filter.

* * * * *

UNITED STATES PATENT AND TRADEMARK OFFICE
CERTIFICATE OF CORRECTION

PATENT NO. : 5,337,093
DATED : August 9, 1994
INVENTOR(S) : Toshihide KANEKO and Eiichi TOIDE It is certified that error appears in the above-indentified patent and that said Letters Patent is hereby corrected as shown below:

In the drawings, Sheet 2, Figure 3, the letters "R" and "B" have been switched to indicate that the red image increases towards the left end of Fig. 3 and decreases towards the right end, while the blue image decreases towards the left end and increases towards the right end of Fig. 3. (as Per attached)

Signed and Sealed this

Fifth Day of March, 1996

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,337,093
DATED : August 9, 1994
INVENTOR(S) : Toshihide KANEKO and Eiichi TOIDE It is certified that error appears in the above-indentified patent and that said Letters Patent is hereby corrected as shown below: